Figures 1, 2, 3, 4:
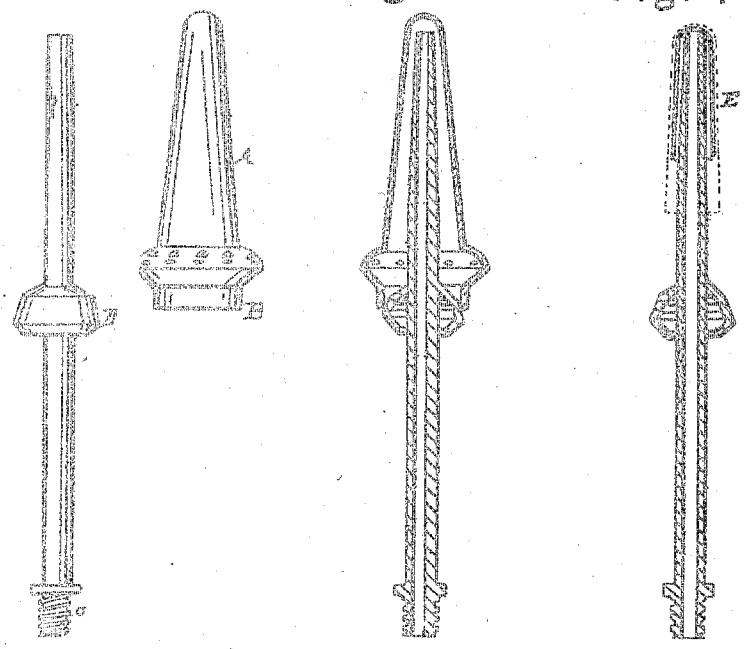

PATENTED MAY 10, 1832.

7049X

S. ANDREWS.

GAS LAMP.

NO PRINTED COPY OF SPECIFICATION IN OFFICE.

7049X Solomon Andrews
Letters Patent

The Schedule referred to in these Letters Patent and making part of the same containing a description in the words of the said Solomon Andrews himself of his improvement in the Gas Lamp To all whom it may concern. Be it known that I Solomon Andrews of Perth Amboy in the County of Middlesex and State of New Jersey have invented an improved Gas Lamp in which oil or other suitable material is converted into gas by the combustion of that which is generated within it, the combustion being continued until all the oil or other suitable material contained in the reservoir of the lamp is decomposed and burnt: And I do hereby declare that the following is a full and exact description of my said invention. On the fifteenth day of April 1831 I obtained a patent for the generating and forming out of oil or other substance used for the purpose the gas which continues and supplies the flame of the gas light by the application of the inflamed gas itself to the oil or other substance used. so as to cause a continued gas light, and without the intervention or use of wicks to burn in contact with the flame and in so constructing and forming the gas lamp or machine as to produce that effect. And on the fifth day of May 1831 I obtained a patent for a mode of commencing the generation of gas by means of Alcohol or other spirits. In the specification of the former of these patents although it was my main intention to secure to myself the right to the general principle therein set forth of which I believed myself to be the discoverer; In order to exemplify the operation of the said principle in a practical way. described a lamp which I had then used, and by which I had fully demonstrated its correctness: or in other words shewn that gas might be advantageously so generated in the course of numerous experiments, however since that period in the prosecution of which I have given to the

[illegible]

the apparatus therein described. a variety of modifications and
have succeeded in so simplifying it as to remove those objec-
tions which existed to the use thereof. My object now therefore is
to secure to myself the exclusive right to the construction of the ap-
paratus in which the decomposition of the oil or other material is
effected under all the modifications of which it is susceptible
whilst its general principle remains unchanged. By this
general principle: I intend a turret bulb or cap into which
the oil or other material is conveyed through a supply pipe
and in which it is converted into gas by the flame of that which
issues through openings in the manner to be presently described,
the flame being made either wholly or partially to surround
the said turret bulb or cap. The drawing hereunto annex-
ed exhibits one of the most approved forms which I now give to the
turret, bulb, or cap, the supply pipe and its appurtenances.
Fig. 1. shews the turret or bulb detached from the supply pipe.
The upper conical part A. I make of brass, copper, silver, or
other material, either soldering or otherwise affixing the lower
part B. thereto forming the whole of one piece a.a a.a. in the
bulging part shew openings through which the generated
gas escapes to undergo combustion. Fig. 2. is the supply pipe
with its appurtenances. This pipe is usually furnished with a
screw C. at its lower end by which it is attached to the conduct-
ing tube from the reservoir of an Argand's or other lamp ——
The diameter of the bore of the supply pipe is usually about
one sixteenth of an inch. The supply of oil is generally regula-
ted by means of a stop cock fixed in the conducting tube of the
lamp. I sometimes however resort to other means as for exam-
ple, instead of the screw at the bottom of the supply pipe. I cause
that pipe to pass through a stuffing box into the conducting
tube, and by sliding it up or down increase or diminish the
quantity admitted without the use of a stop cock. The expan-
ded part or stopper of the supply pipe D. is made to fit into
the 7049x May 10, 1832 the lower part B. of Fig 1. as a stopper fits into a bottle. This allows of their ready separation for the purpose of cleaning and removing any matter which may accumulate & obstruct the combustion. Fig 3 shows a section of the turret and of the supply pipe in its place. To increase the surface to which the oil or other material is exposed within the bulb I sometimes surround the supply pipe within the turret or bulb with fine wire, or twist a piece of rag, cotton, wool or other fibrous material around it so as nearly to fill the capacity of the upper or conical part. Instead of these modes a metal cap may be placed over the supply pipe as shown at E. Fig 4 which may be surrounded by a second tube conducting the oil, or gas, up, as shown by the dotted lines, and upon this principle the gas may be made to pass up & down between cylinders of metal as frequently as may be desired. Another mode which I found to answer a good purpose is to take a piece of thin sheet metal and to roll it up so as to form a scroll and passing this over so as to surround the supply pipe. Small plates of metal placed transversely upon the supply pipe one above the other will answer the same purpose. I have thus shown a variety of devises which may be adapted in carrying into effect my plan of generating gas not intending however to limit myself to these or to claim them as making an essential part of my said invention, but to show that it is susceptible of a great variety of modifications whilst the principle upon which the gas generating apparatus operates remains unchanged. In commencing the generation of gas I pursue the mode described in my patent of the fifth day of May 1831 above alluded to adopting in practice the most simple form there described, namely the fixing a small metallic cup surrounding the supply pipe, below the turret or bulb into which a few drops of spirit are poured and then inflamed. I most commonly surround the flame by an Argand burner. What I claim as my invention is the combining an apparatus paratus for the generation of gas. in my gas lamp, which appara
tus consists of a turret. bulb. or cup into which the oil or other mate
rial is conveyed through a supply pipe, and in which it is con
verted into gas by the action of the flame. of that portion thereof
which is made to burn as it issues through openings which are so
situated as to cause the flame either wholly or partially to surround
the said turret: bulb or cup whether the same be made in the exact
form herein before set forth or in any other operating upon the same
principle.

Witnesses
Thomas P. Jones
E. M. Johnson

Solomon Andrews

Exd.
W.C.

[12 60 [illegible]